United States Patent
Jeong et al.

(10) Patent No.: US 6,396,245 B1
(45) Date of Patent: May 28, 2002

(54) METHOD FOR GAUGING BATTERY VOLTAGE OF PORTABLE TERMINAL

(75) Inventors: Youn Jo Jeong; Jae Cheol Kwak, both of Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/714,430

(22) Filed: Nov. 17, 2000

(30) Foreign Application Priority Data

Nov. 18, 1999 (KR) .............................................. 99/51359

(51) Int. Cl.$^7$ ................................................... H02J 7/00
(52) U.S. Cl. ...................................................... 320/132
(58) Field of Search ................................. 320/132, 136

(56) References Cited

U.S. PATENT DOCUMENTS

| | | | | |
|---|---|---|---|---|
| 5,027,294 A | * | 6/1991 | Fakruddin et al. | 320/136 |
| 5,371,682 A | * | 12/1994 | Levine et al. | 320/136 |
| 5,912,544 A | * | 6/1999 | Miyakawa et al. | 320/106 |
| 5,977,750 A | * | 11/1999 | Ng et al. | 320/132 |

* cited by examiner

*Primary Examiner*—Adolf Deneke Berhane
*Assistant Examiner*—Pia Tibbits
(74) *Attorney, Agent, or Firm*—Fleshner & Kim, LLP (57) ABSTRACT

A method for gauging a battery voltage of a portable terminal is disclosed, in which low voltage alarm and power cutoff time are determined by obtaining characteristic of a discharge curve slope of the battery, thereby improving reliability of the battery and increasing its available time. The method includes the steps of converting an analog voltage value, sampling the converted digital voltage value at a constant period, comparing the sampled digital voltage value with a predetermined number of previously sampled digital value to obtain a value of a discharge curve slope of the battery, and displaying remaining state of the battery depending on the obtained slope value.

12 Claims, 6 Drawing Sheets

METHOD FOR GAUGING BATTERY VOLTAGE OF PORTABLE TERMINAL

BACKGROUND OF THE INVENTION

1. Field of the Invention

The present invention relates to a portable terminal, and more particularly, to a method for gauging a battery voltage of a portable terminal which uses batteries having different capacities.

2. Background of the Related Art

Generally, a portable terminal is designed to be detached to use a plurality of batteries in preparation for impossible recharging for a long time. Examples of batteries fixed to the portable terminal include a small capacity type, a medium capacity type and a large capacity type.

To use the batteries having different capacities in one portable terminal, exact gauging is required. For exact gauging, a device capable of gauging a battery voltage depending on each capacity is required.

However, it is actually difficult to provide a device capable of gauging remaining voltage capacity of each battery due to complexity of hardware of the portable terminal, its size and cost.

Before such a gauging of the battery, voltage values corresponding to a low voltage alarm time and power cutoff time should be gauged.

Such a gauging of the battery voltage values is to prevent error operation of hardware from occurring when the remaining voltage of the battery is less than a voltage for operating the portable terminal.

A related art apparatus and method for gauging a battery voltage of a portable terminal will be described with reference to the accompanying drawings.

Figure 1:
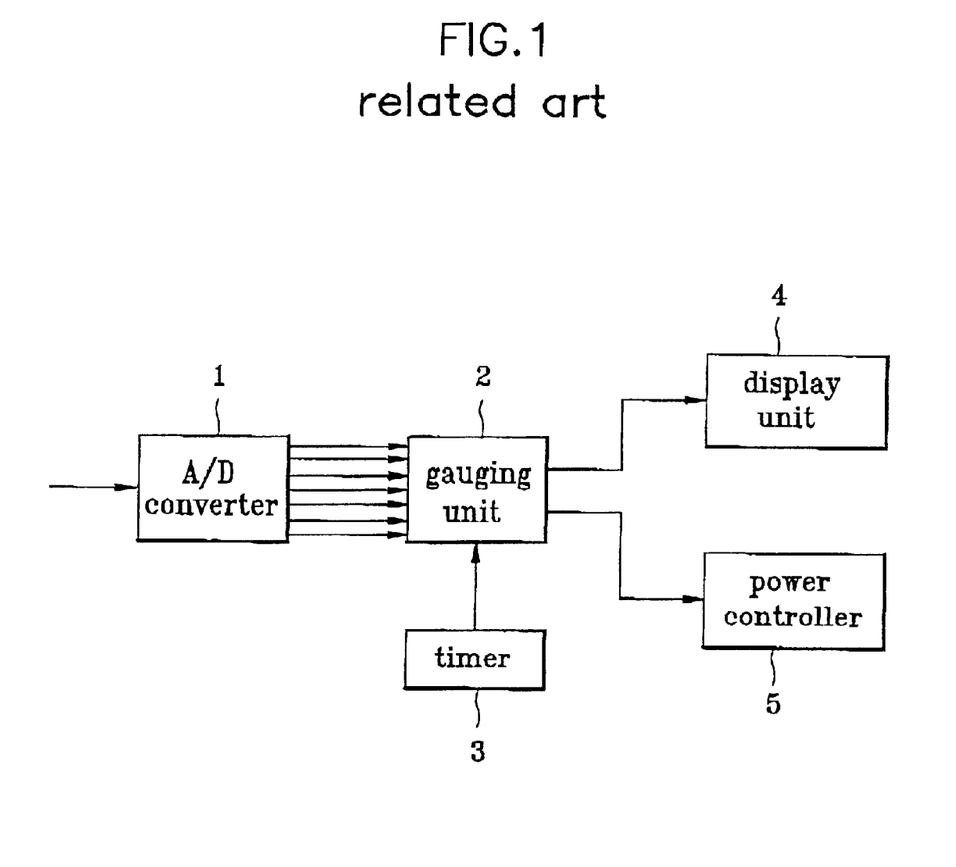
FIG. 1 is a block diagram showing a related apparatus for gauging a battery voltage of a portable terminal.
Figure 2:
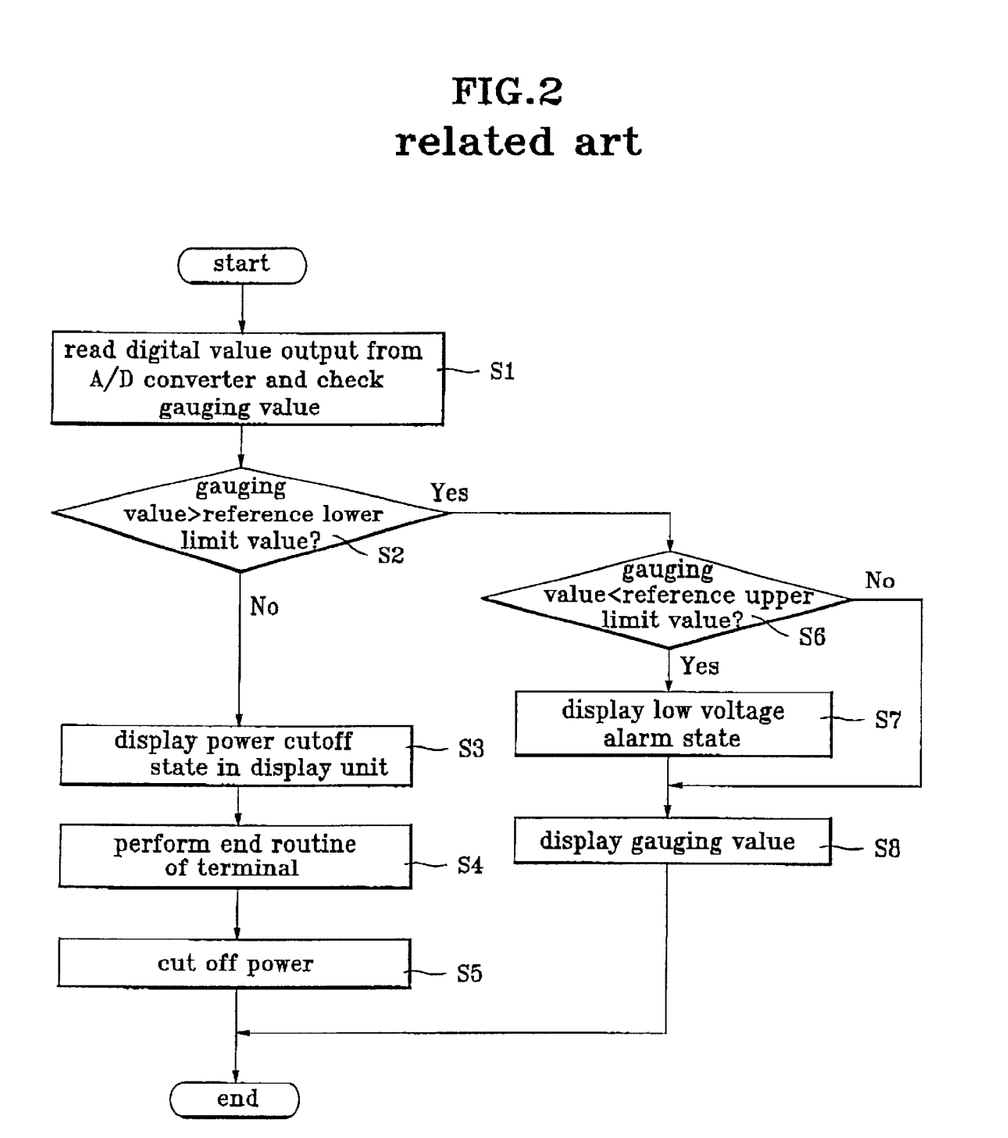
FIG. 2 is a flow chart showing a related art method for gauging a battery voltage of a portable terminal.
Figure 3:
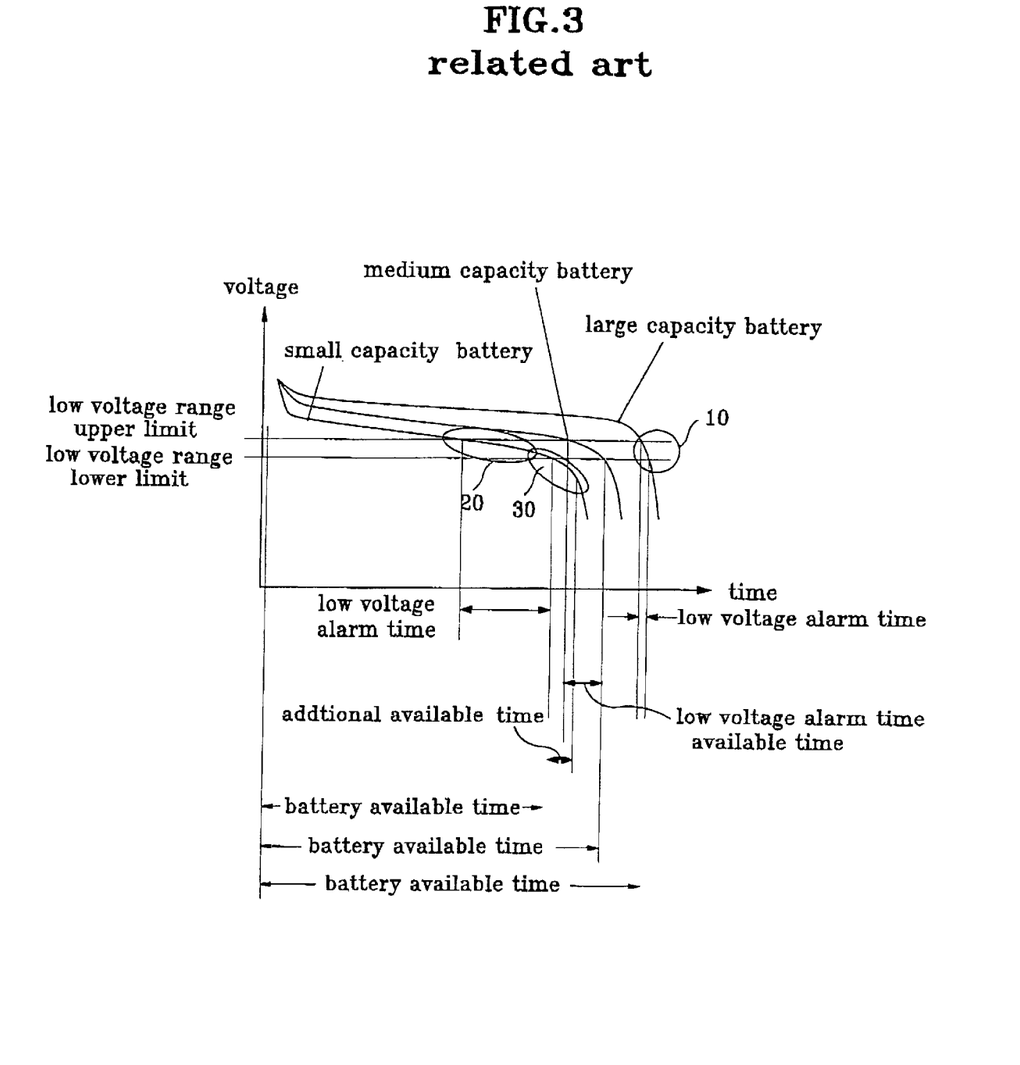
FIG. 3 is a diagram showing battery available time and alarm time displayed in a display unit of the portable terminal in accordance with the related art method for gauging a battery voltage of a portable terminal.

FIG. 1 is a block diagram showing a related apparatus for gauging a battery voltage of a portable terminal, FIG. 2 is a flow chart showing a related art method for gauging a battery voltage of a portable terminal, and FIG. 3 is a diagram showing battery available time and alarm time displayed in a display unit of the portable terminal in accordance with the related art method for gauging a battery voltage of a portable terminal.

As shown in FIG. 1, the related art apparatus for gauging a battery voltage of a portable terminal includes an A/D converter 1 for converting an analog voltage level output from a cathode of a battery to a digital voltage level, a gauging unit 2 for gauging the converted digital voltage level at a constant period, a timer 3 for inputting time interval designated in the gauging unit 2, a display unit 4 for displaying remaining capacity of the battery from an output of the gauging unit 2, and a power controller 5 for controlling power of hardware depending on an output voltage of the gauging unit 2.

The operation of the related art apparatus for gauging a battery voltage of a portable terminal will be described below.

The analog voltage level output from the cathode of the battery is converted to a digital voltage level through the A/D converter 1 of a predetermined bit. At this time, the timer 3 outputs a signal to the gauging unit 2 at a prescribed time interval.

The gauging unit 2 receives the signal from the timer 3 and performs gauging by sampling the digital value converted by the A/D converter 1. At this time, the gauging unit 2 determines a range of a specific voltage level in a prescribed period and compares the prescribed period with a period corresponding to a sampling value, thereby displaying the resultant value in the display unit 4.

The related art method for gauging a battery voltage of a portable terminal will be described with reference to FIG. 2.

The digital value converted by the A/D converter is read at a prescribed constant period (S1).

The digital value read at the prescribed constant period is gauged, and it is determined whether the gauging value is greater than a prescribed reference lower limit value (S2).

As a result of the determination (S2), if the gauging value is less than the prescribed reference lower limit value, a power cutoff state is displayed in the display unit and an end routine of the terminal is performed to cut off the power (S3~S5).

Meanwhile, as a result of the determination (S2), if the gauging value is greater than the prescribed reference lower limit value, it is determined whether the gauging value is less than the prescribed reference upper limit value (S6).

Subsequently, as a result of the determination (S6), if the gauging value is less than the prescribed reference upper limit value, a low voltage alarm state and current remaining capacity of the battery are displayed in the display unit (S7~S8).

In the aforementioned related art method for gauging a battery of a portable terminal, as shown in FIG. 3, upper and lower limits of a low voltage are preset depending on the capacity of the battery. A corresponding period of the sampled is value is determined through the gauging unit 2 so that the current remaining capacity of the battery is displayed in the display unit 4.

Therefore, when the gauging value reaches a level corresponding to low voltage, the low voltage alarm state is displayed in the display unit to allow a user to recognize the remaining capacity of the battery. If the gauging value is lowered less than an allowed low voltage level, the power cutoff state is displayed in the display unit.

After the end routine of the terminal is performed, the power controller is instructed to cut off the power so that error operation of the terminal can be avoided. Thus, the power of the terminal is cut off.

However, the aforementioned related art apparatus and method for gauging a battery of a portable terminal has several problems.

If the capacity of the battery is greater than the reference capacity, variation of the voltage at the time of the power cutoff rapidly occurs. This could lead to short required time between the low voltage alarm time and the power cutoff time of the terminal. In this case, the low voltage alarm may not be exactly displayed or the power of the terminal may be cut off abnormally without the end routine.

Furthermore, if the capacity of the battery is less than the reference capacity, the low voltage alarm state may continuously be displayed or the power may be cut off in even case where the available time of the battery remains sufficiently.

SUMMARY OF THE INVENTION

Accordingly, the present invention is directed to a method for gauging a battery voltage of a portable terminal that substantially obviates one or more of the problems due to limitations and disadvantages of the related art.

An object of the present invention is to provide a method for gauging a battery voltage of a portable terminal in which low voltage alarm display time and power cutoff time are determined by obtaining characteristic of a discharge curve slope of the battery, thereby improving reliability of the battery and increasing its available time.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method for gauging a battery voltage of a portable terminal according to the present invention includes the steps of converting an analog voltage value output from a battery to a digital voltage value, sampling the converted digital voltage value at a constant period, comparing the sampled digital voltage value with a predetermined number of previously sampled digital value to obtain a value of a discharge curve slope of the battery, and displaying remaining state of the battery depending on the obtained slope value.

It is to be understood that both the foregoing general description and the following detailed description are exemplary and explanatory and are intended to provide further explanation of the invention as claimed.

BRIEF DESCRIPTION OP THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIES

Reference will now be made in detail to the preferred embodiments of the present invention, examples of which are illustrated in the accompanying drawings.

Figure 5:
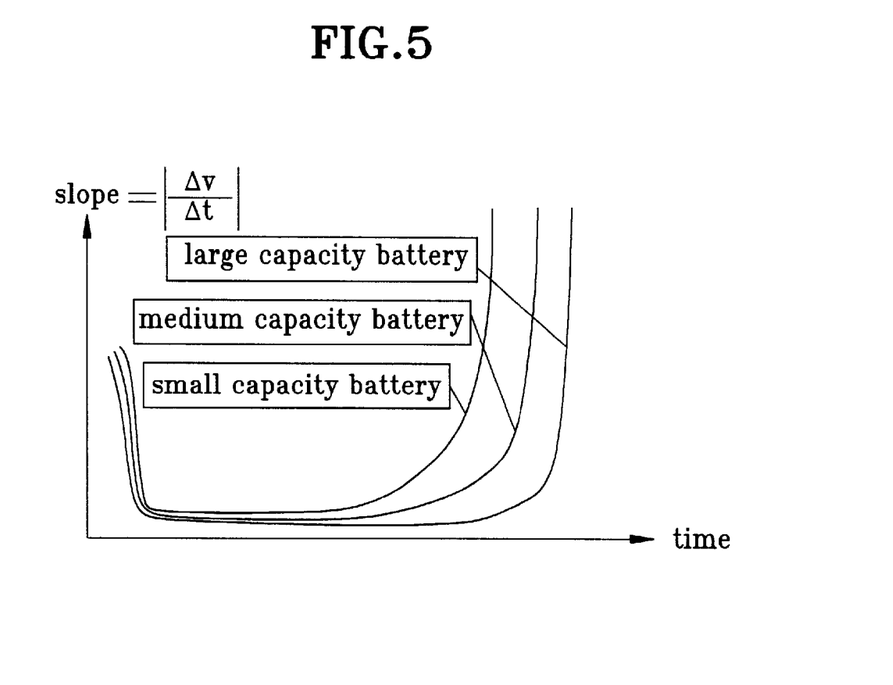
FIG. 5 is a diagram showing a slope depending on the capacity of a battery in a method for gauging a battery voltage of a portable terminal according to the present invention.

In a method for gauging a battery voltage of a portable terminal according to the present invention, a variation value of a slope corresponding to low voltage alarm time and power cutoff time should be determined in advance as shown in FIG. 5.

Figure 4:
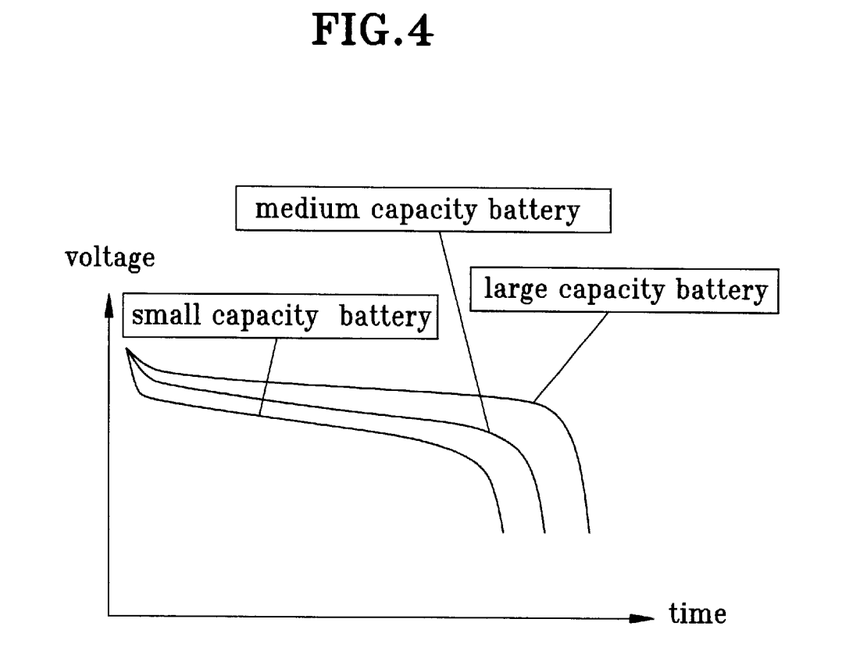
FIG. 4 is a diagram showing voltage drop depending on the capacity of a battery in a method for gauging a battery voltage of a portable terminal according to the present invention.

Load capacity required to normally operate a portable terminal is applied to a battery. The amount of voltage drop for each capacity is gauged at a prescribed unit time interval to obtain a discharge curve. In FIG. 4, a discharge curve of a lithium ion battery is shown. It is noted in FIG. 4 that the discharge curve of the battery is substantially horizontal regardless of the capacity of the battery in case where the entire capacity of the battery is two times or more of the load capacity for operating the portable terminal.

Figure 6:
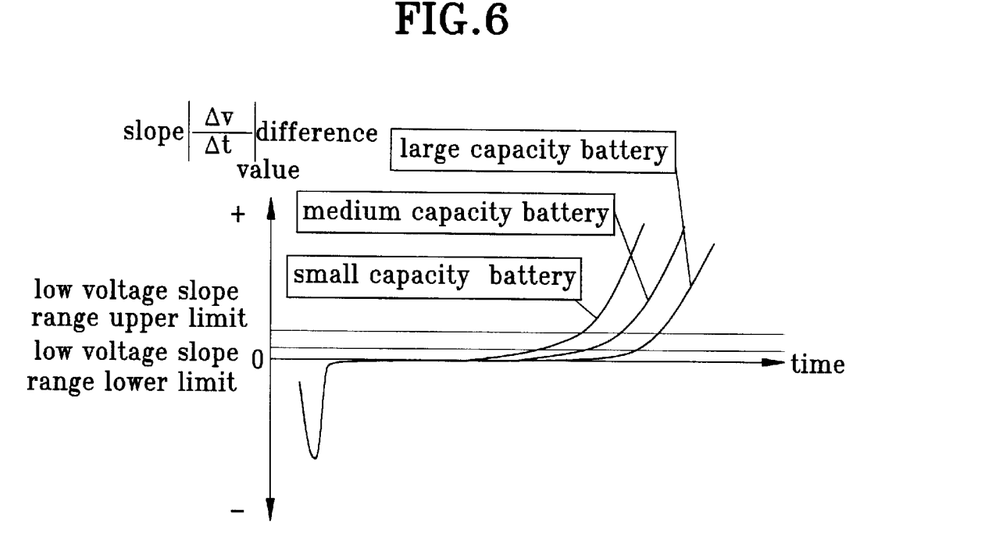
FIG. 6 is a diagram showing a difference value of a slope depending on the capacity of a battery in a method for gauging a battery voltage of a portable terminal according to the present invention.

Subsequently, as shown in FIGS. 5 and 6, a voltage drop slope of the battery is obtained, over a prescribed unit time interval. At this time, it is noted that the discharge slope of the battery may not change substantially during an initial discharge time interval of the battery. The slope may not change substantially during the next time interval. However, it is noted that, after more time passes, the discharge slope becomes more steep, and the difference between successive slope value increases as the capacity of the battery decreases.

As shown in FIG. 6, the difference value of the slope depending on each capacity of the battery is obtained at a prescribed time interval. For example, it is assumed that a charge voltage of the battery is varied in the order of 3.5V, 3.48V, 3.45V, and 3.40V when gauging the battery voltage at a prescribed time unit. In this case, the voltage drop slope is varied in the order of 0.02, 0.03, and 0.05. It is noted that the difference value of the slope becomes greater depending on lapse of the time.

Particularly, referring to FIG. 6, voltage drop of the battery gradually becomes rapid from the time when the difference value of the slope is greater than 0.

Upper and lower limit values of the low voltage slope are determined depending on the difference value of the voltage drop slope of the battery. At this time, the low voltage upper and lower limit values should be determined greater than a rated voltage of the portable terminal.

The upper and lower limit values of the low voltage slope gauged at a prescribed time interval are stored in a nonvolatile ferroelectric memory (not shown) inside the portable terminal so as to be used as reference values when gauging the battery voltage.

Figure 7:
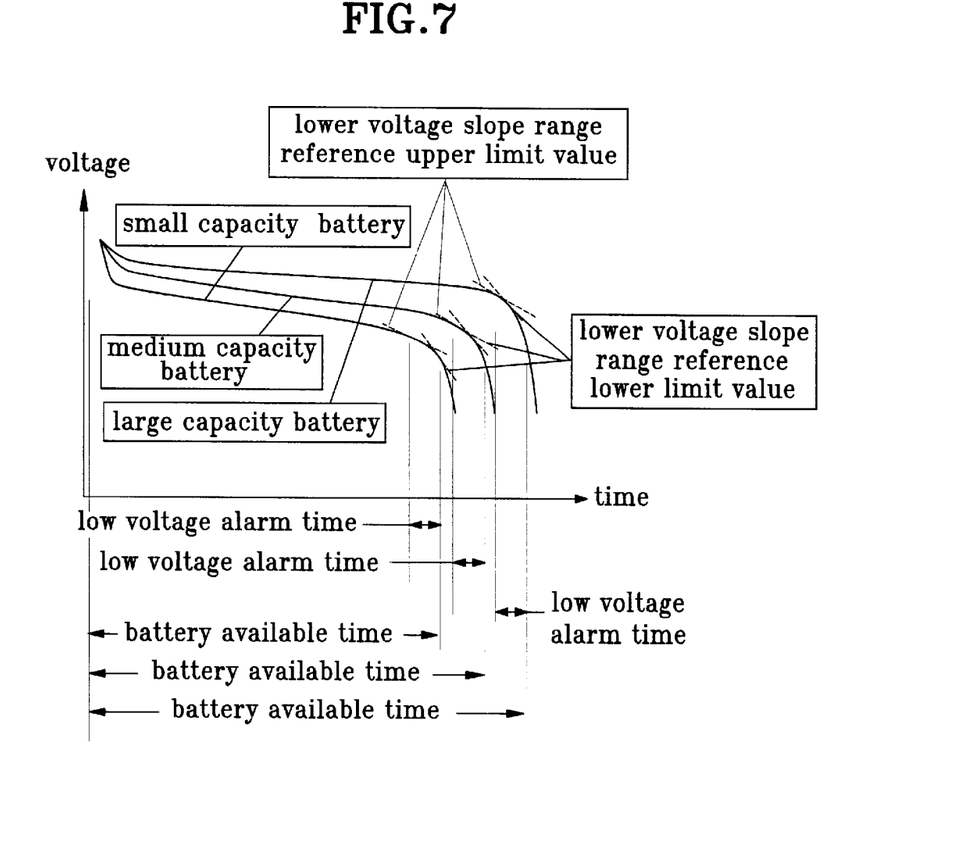
FIG. 7 is a diagram showing battery available time and low voltage alarm time displayed in a display unit of a portable terminal in a method for gauging a battery voltage of a portable terminal according to the present invention.

In the aforementioned method for gauging a battery voltage of a portable terminal according to the present invention, as shown in FIG. 7, the battery available time and the low voltage alarm time can be displayed uniformly regardless of the capacity of the battery by determining whether a currently obtained slope value exists between the prescribed reference upper and lower limit values. At this time, the battery available time and the low voltage alarm time may be recognized by a speaker or buzzer in addition to the display unit of the portable terminal.

The method for gauging a battery voltage of a portable terminal according to the present invention will now be described with reference to FIG. 8.

Figure 8:
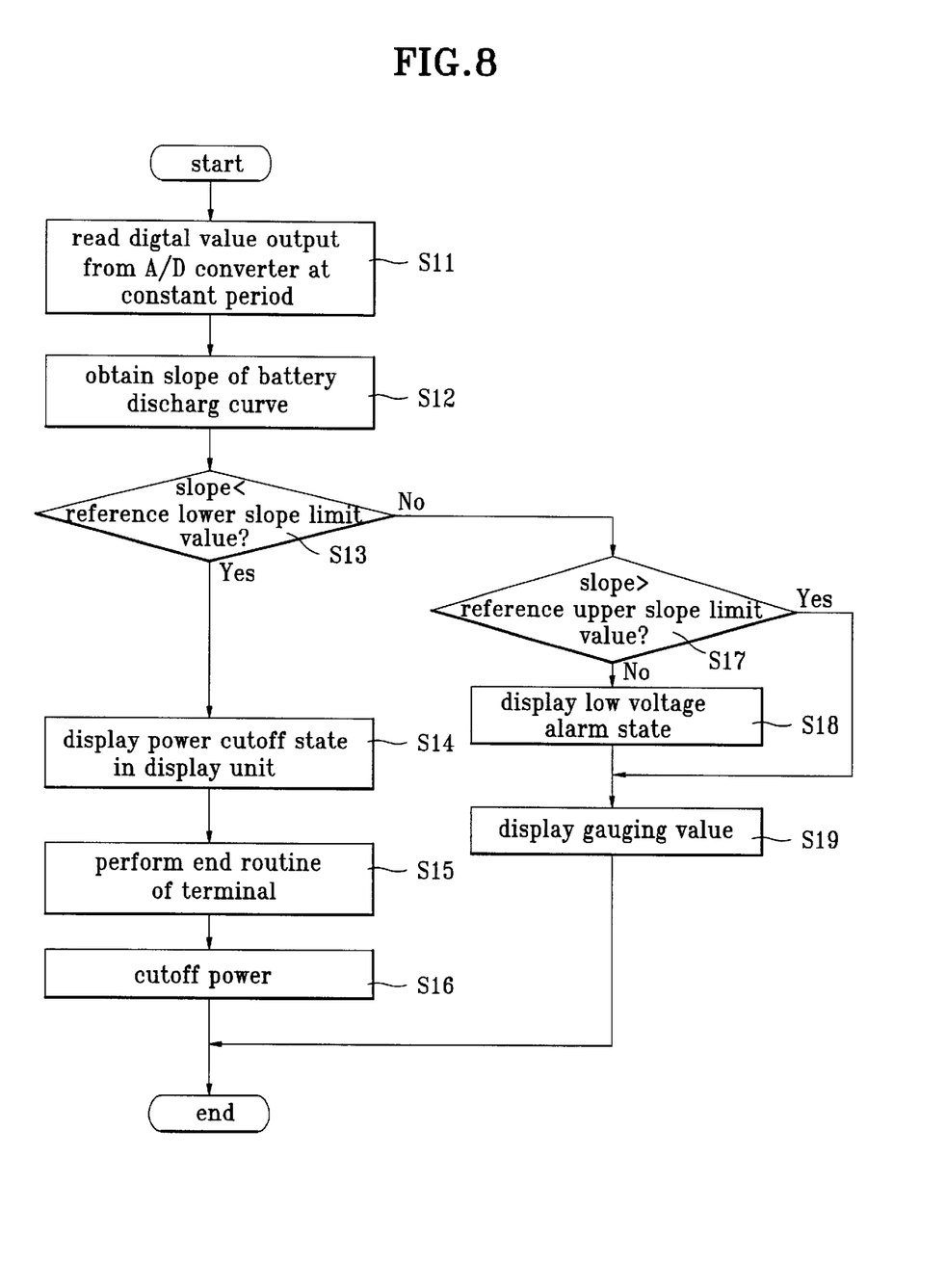
FIG. 8 is a flow chart showing a method for gauging a battery voltage of a portable terminal according to the present invention.

Referring to FIG. 8, the digital value output from the A/D converter is read at a constant period (S11).

A sampling value of the current digital value is compared with the prescribed reference sampling value to obtain the discharge curve slope of the battery (S12). It is determined whether the obtained slope value is greater than the prescribed reference lower limit value (513).

As a result of the determination (S13), if the obtained slope value is less than the prescribed reference lower limit value, a power cutoff state is displayed in the display unit (S14). Then, an end routine of the terminal is performed to cut off the power of the terminal (S15–S16).

Meanwhile, as a result of the determination (S13), if the obtained slope value is greater than the prescribed reference lower limit value, it is determined whether the obtained slope value is greater than the prescribed reference upper limit value (S17).

Subsequently, as a result of the determination (S17), if the obtained slope value is less than the prescribed reference upper limit value, a low voltage alarm state is displayed and current remaining capacity of the battery, i.e., gauging value is also displayed in the display unit (S18–S19). At this time, an alarm sound may be generated by a buzzer of speaker of the portable terminal.

In the aforementioned method for gauging a battery of a sortable terminal according to the present invention, the value of the discharge curve slope of the current battery, the difference value of the slope, and the variation value of the difference are obtained by the converted value from the A/D converter at a prescribed time interval. It is determined whether the obtained variation value of the difference of the slope is within a prescribed range. Thus, if the variation value of the slope is less than the upper limit value of the low voltage slope, the low voltage alarm state is displayed in the display unit. On the other hand, if the variation value of the slope is lowered less than the lower limit value of the low voltage slope, the power cutoff state is displayed in the display unit. Then, the power is cut off to avoid error operation of the terminal after the end routine of the terminal is performed.

As aforementioned, the method for gauging a battery voltage of a portable terminal according to the present invention has the following advantages.

Since gauging is performed using the discharge curve slope of the battery, the power cutoff time can easily be recognized regardless of the capacity of the battery. Furthermore, since a device capable of gauging a battery voltage depending on the capacity of the battery is not required, the size, weight, and the production cost of the terminal can be minimized. In addition, since the low voltage alarm display time and the power cutoff display time can uniformly be maintained, it is possible to end the current operation without any error. Finally, the battery available time can sufficiently be used, use time of the battery becomes longer during one time charge.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A method for gauging a battery voltage of a portable terminal comprising:

converting an analog voltage value output from a battery to a digital voltage value;

sampling the digital voltage value at a predefined interval;

calculating a discharge curve slope by comparing a first sampled digital voltage value to a second sampled digital voltage value over a prescribed time interval;

comparing the discharge curve slope to a predefined lower slope limit and a predefined upper slope limit; and outputting a status of the battery based on the comparison of the discharge curve slope to the predefined lower and upper limits.

2. The method of claim 1, wherein outputting a status of the battery includes displaying a power cutoff state in a display unit of a portable terminal if the discharge curve slope is less than the predefined lower slope limit required for normal operation of the portable terminal.

3. The method of claim 1, wherein outputting a status of the battery includes displaying a low voltage alarm state in a display unit of a portable terminal if the discharge curve slope is greater than the predefined lower slope limit and less than the tax predefined upper slope limit.

4. The method of claim 3, wherein outputting the status of the battery includes further displaying one of a measured battery voltage and a value of remaining battery life together with the low voltage alarm state.

5. The method of claim 3, wherein outputting the status of the battery includes periodically generating a low voltage alarm sound through a speaker or buzzer of the portable terminal while displaying the low voltage alarm state in the display unit.

6. The method of claim 1, wherein the battery has constant discharge curve characteristics even in a case of different load capacities.

7. A system for gauging battery voltage of a portable terminal comprising:

converting means for converting an analog voltage value output from a battery to a digital voltage value;

sampling means, coupled to the converting means, for sampling the digital voltage value at a predefined interval;

calculating means, coupled to the sampling means, for calculating a discharge curve slope by comparing a first sampled digital voltage value to a second sampled digital voltage value over a prescribed time interval;

comparing means, coupled to the calculating means, for comparing the discharge curve slope to a predefined lower slope limit and a predefined upper slope limit; and outputting means, coupled to the comparing means, for outputting a status of the battery based on the comparison of the discharge curve slope to the predefined lower and upper slope limits.

8. A method for gauging a battery voltage of a portable terminal comprising:

converting an analog voltage value output from a battery to a digital voltage value;

sampling the digital voltage value at a predefined interval;

calculating a first discharge curve slope by comparing a first sampled digital voltage value to a second sampled digital voltage value over a prescribed time interval;

calculating a second discharge curve slope by comparing a third sampled digital voltage value to a fourth sampled digital voltage value over the prescribed time interval;

calculating a slope difference by comparing the first discharge curve slope to the second discharge curve slope;

comparing the slope difference to a predefined lower slope difference limit and a predefined upper slope difference limit; and outputting a status of the battery based on the comparison of the slope difference to the predefined lower and upper slope difference limits.

9. The method of claim 8, wherein outputting a status of the battery includes displaying a power cutoff state in a display unit of a portable terminal if the slope difference is less than the predefined lower slope difference limit required for normal operation of the portable terminal.

10. The method of claim 8, wherein outputting a status of the battery includes displaying a low voltage alarm state in a display unit of a portable terminal if the slope difference is greater than the predefined lower slope difference limit and less than the predefined upper slope difference limit.

11. The method of claim 10, wherein outputting the status of the battery includes further displaying one of a measured battery voltage and a value of remaining battery life together with the low voltage alarm state.

12. The method of claim 10, wherein outputting the status of the battery includes periodically generating a low voltage alarm sound through a speaker or buzzer of the portable terminal while displaying the low voltage alarm state in the display unit.

* * * * *